United States Patent
Shin et al.

(10) Patent No.: US 7,075,708 B2
(45) Date of Patent: Jul. 11, 2006

(54) TOP-PUMPED WAVEGUIDE AMPLIFIER

(75) Inventors: Jung-Hoon Shin, Daejon (KR); Hak-Seung Han, Daejon (KR); Nam-Kyoo Park, Seoul (KR)

(73) Assignee: Luxpert Technologies Co., Ltd., Seoul (KR)

( * ) Notice: Subject to any disclaimer, the term of this patent is extended or adjusted under 35 U.S.C. 154(b) by 148 days.

(21) Appl. No.: 10/503,019

(22) PCT Filed: Jan. 29, 2003

(86) PCT No.: PCT/KR03/00207

§ 371 (c)(1),
(2), (4) Date: Jul. 28, 2004

(87) PCT Pub. No.: WO03/065093

PCT Pub. Date: Aug. 7, 2003

(65) Prior Publication Data

US 2005/0122569 A1    Jun. 9, 2005

(30) Foreign Application Priority Data

Jan. 29, 2002    (KR) .................... 10-2002-0005142

(51) Int. Cl.
*H01S 3/00* (2006.01)
*G02B 6/10* (2006.01)

(52) U.S. Cl. ..................................... 359/333; 385/129

(58) Field of Classification Search ............... 385/129, 385/126; 359/333
See application file for complete search history.

(56) References Cited

U.S. PATENT DOCUMENTS 6,661,035 B1 * 12/2003 Negro et al. ................ 257/105
6,710,366 B1 *  3/2004 Lee et al. ..................... 257/14
6,785,304 B1 *  8/2004 Filgas ........................ 372/19

(Continued)

FOREIGN PATENT DOCUMENTS

EP    1 000 949 A1    5/2000

(Continued)

OTHER PUBLICATIONS

Shimizu et al. Design of Semiconductor-waveguide-type optical isolators using the nonreciprocal loss/gain in the magneto-optical waveguides having MnAs nanoclusters. Applied Physics Letters. vol. 81. No. 27. Dec. 30, 2002. pp. 5246-5248.*

English Language Abstract of Korean Patent Application No. 970006019.

*Primary Examiner*—Deandra M. Hughes
(74) *Attorney, Agent, or Firm*—Marger Johnson & McCollom P.C.

(57) ABSTRACT

The present invention relates to a waveguide amplifier which is comprised of silica or silica-related material co-doped with silicon nanoclusters and rare earth elements, and more particularly, to a waveguide amplifier with higher efficiency enhanced by top-pumping method and focusing means for pumping light. The waveguide amplifier of the present invention comprises of: (a) a substrate; (b) an optical waveguide including: a lower cladding layer formed on the substrate; a core layer which is made of silica or silica-related material co-doped with silicon nanoclusters and rare earth elements on the lower cladding layer and has a refractive index higher than that of the lower cladding; and an upper cladding layer formed on the core layer; and (c) a light source, spaced apart from the waveguide, for optically pumping the waveguide, wherein the waveguide amplifier operates by exciting the rare earth elements through electron-hole combinations in the silicon nanoclusters.

8 Claims, 3 Drawing Sheets

U.S. PATENT DOCUMENTS

| | | | |
|---|---|---|---|
| 6,822,305 B1 * | 11/2004 | Hunt | 257/432 |
| 2003/0156319 A1 * | 8/2003 | John et al. | 359/341.5 |
| 2004/0106285 A1 * | 6/2004 | Zacharias | 438/689 |
| 2005/0077526 A1 * | 4/2005 | Shin et al. | 257/79 |
| 2006/0012853 A1 * | 1/2006 | Tallone et al. | 359/333 |

FOREIGN PATENT DOCUMENTS

| | | | |
|---|---|---|---|
| JP | 11014841 A | * | 1/1999 |
| JP | 2002110573 A | * | 4/2002 |
| KR | 970006019 | | 2/1997 |

* cited by examiner

TOP-PUMPED WAVEGUIDE AMPLIFIER

TECHNICAL FIELD

The present invention relates to a silica or silica-based waveguide amplifier which is co-doped with silicon nanoclusters and rare earth atoms, and more particularly to a waveguide amplifier with improved efficiency, resulting from using a top pumping process and means for focusing a pump light.

BACKGROUND ART

Recently, rare earth-doped silica or silica-based materials have most widely been used to manufacture waveguide amplifiers. However, because a light source directly pumps the rare earth atoms, and because rare earth atoms have narrow absorption bands and small absorption cross sections of the order of $4 \times 10^{-21} cm^2$, in order to pump such a waveguide amplifier, an end fire technique must be used for coupling light into the waveguide through an optical fiber using a high-priced laser as the light source.

In case of doping silicon nanoclusters with rare earth atoms in such a waveguide, an electron-hole combination formed in the nanocluster can give rise to excitation of the rare earth atoms. The effective excitation cross section is approximately $1 \times 10^{-15} cm^2$. Considering that the concentration of the silicon nanocluster is generally $1 \times 10^{18}$ $cm^3$, the above value corresponds to an absorption depth of 10 µm or less. In this regard, if a waveguide amplifier made of the aforementioned two materials is subjected to a top pumping process, in which a light source is positioned above the waveguide, although no such attempts have been made, it may have an enhanced efficiency. In particular, because there are no particular limitations to a light source so long as the light source can generate carriers in the silicon nanocluster, a low-priced wide band light source such as LED can be used instead of a high-priced laser. However, contrary to the end fire technique for coupling almost all light from a light source into a waveguide through an optical fiber, the top pumping process, in which a light source is positioned above a waveguide, cannot allow all light from the light source to enter the waveguide. As a result, an actual pump power is substantially decreased relative to that from the light source, thereby lowering the excitation efficiency.

DISCLOSURE OF THE INVENTION

Therefore, the present invention has been made in view of the above problems, and it is the objective of the present invention to provide a waveguide amplifier using a top pumping process, which can efficiently focus light from a light source onto the waveguide.

In accordance with the present invention, the above objective and other objectives can be accomplished by the provision of a waveguide amplifier, comprising:

(a) a substrate;

(b) an optical waveguide including a lower cladding layer formed on the substrate, a core layer formed on the lower cladding layer, which is made of a silica or silica-based material co-doped with silicon nanoclusters and rare earth atoms and has a higher refractive index than the lower cladding layer, and an upper cladding layer formed on the core layer; and (c) a light source for pumping the waveguide, which is positioned above the waveguide, characterized in that the waveguide amplifier is operated in a manner such that the rare earth element is excited through an electron-hole combination formed in the silicon nanocluster.

Preferably, the light source is a visible light source, more preferably, LED or a flash lamp.

Preferably, multiple optical waveguides are arranged in the beam spot of the light source.

Preferably, the waveguide amplifier further comprises means for focusing a pump light from the light source onto the waveguide.

In accordance with the first embodiment of the present invention, the pump light from the light source is refractively focused onto the waveguide, which is formed with prominences in the form of convex lenses on the upper cladding layer thereof.

In accordance with the second embodiment of the present invention, the pump light from the light source is reflectively focused onto the waveguide, which is formed with mirror surfaces.

In accordance with the third embodiment of the present invention, the pump light from the light source is reflectively focused onto the waveguide using mirror surfaces formed on the substrate.

BRIEF DESCRIPTION OF THE DRAWINGS

The above and other objectives, features, and other advantages of the present invention will be more clearly understood from the following detailed description taken in conjunction with the accompanying drawings, in which.

BEST MODE FOR CARRYING OUT THE INVENTION

Hereinafter, the embodiments of the present invention will be described in detail with reference to the accompanying figures.

Figure 1:
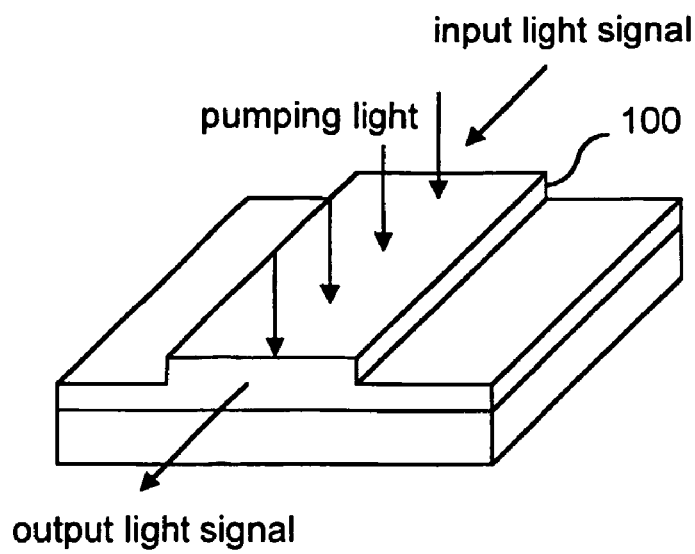
FIG. 1 is a schematic view showing a top pumping process.

FIG. 1 is a schematic view showing a top pumping process. A silica or silica-based waveguide which is co-doped with silicon nanoclusters and rare earth atoms strongly absorbs visible light but does not absorb infrared light. Based on this fact, a wide band light source (not shown) is positioned above the waveguide 100 in a manner such that it transmits visible pump light to the waveguide. The pump light injected into the waveguide 100 generates electron-hole combinations in the nanocluster, whereby the rare earth element is excited. An input light signal is amplified through the waveguide 100 using the energy generated from the excited rare earth element and then exits in the form of an output light signal.

Figure 2:
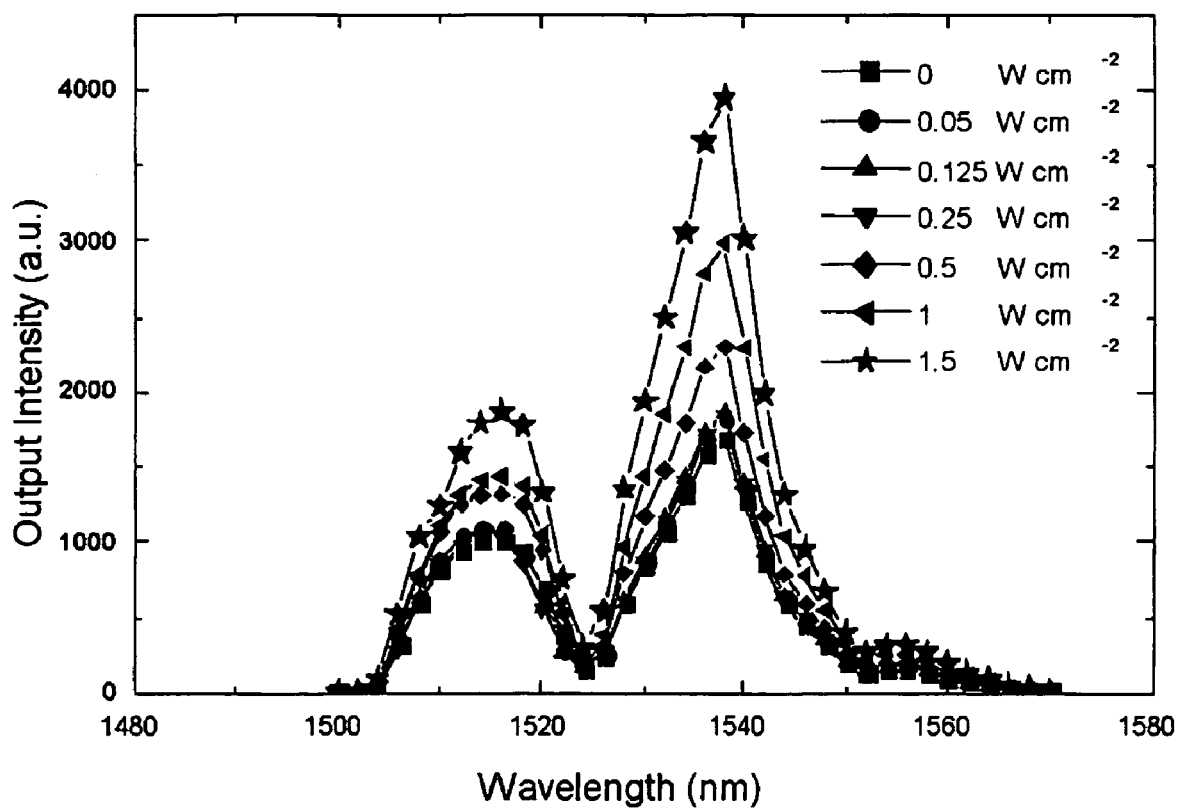
FIG. 2 is a graph showing intensities of output light signals in a waveguide amplifier using a top pumping process.

FIG. 2 is a graph showing intensities of output light signals in a waveguide amplifier using a top pumping process. The graph curves represent the spectra of output light signals after inputting light signals into the waveguide and pumping the waveguide using a pump light. Referring to FIG. 2, it can be seen that input light signals are amplified at a pump power of more than 0.5 W/cm$^2$. The embodiments of FIG. 2 did not use means for focusing a pump light onto the waveguide. The use of the focusing means can further increase the amplification efficiency of the waveguide amplifier.

Meanwhile, in case of such a top pumping process using a wide band light source, because light from the light source is scattered, all the light from the light source is not used to pump the waveguide amplifier. Therefore, in order to solve this problem, there is a need to increase the size of the waveguide, or alternatively to focus light from the light source onto the waveguide.

Figure 3:
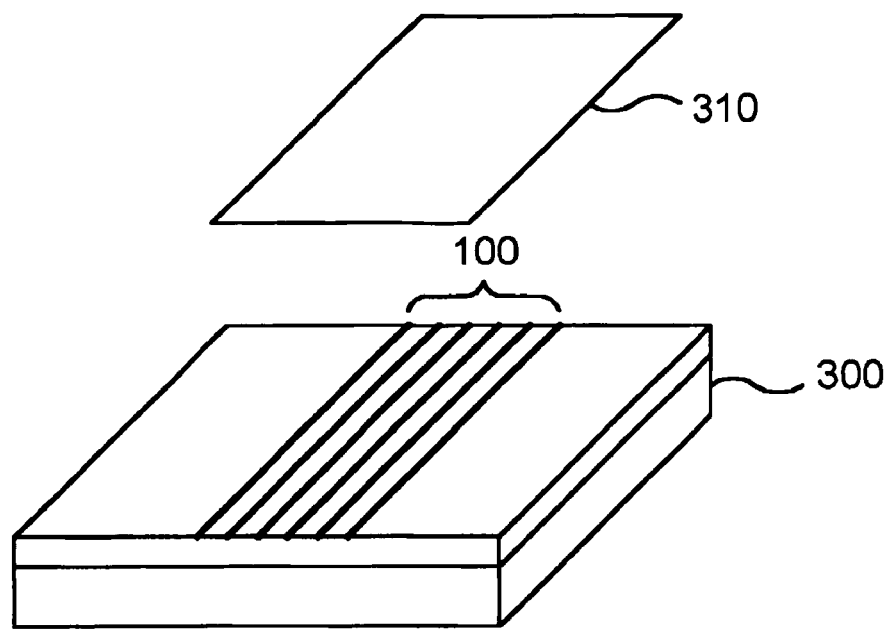
FIG. 3 is a schematic view showing a top pumping process in waveguides sharing a pump light.

However, the size of the waveguide cannot exceed 10 μm because of an optical fiber-to-waveguide coupling problem and the like. Furthermore, for the purpose of focusing light from the light source, it is impossible to infinitely reduce the beam spot size. Conventionally, the beam spot size in a wide band light source is approximately 1 mm. In this regard, it is possible to arrange several tens of waveguides in the beam spot. As a result, the pumping efficiency can be increased correspondingly. FIG. 3 is a schematic view showing a top pumping process in waveguides sharing a pump light. Referring to FIG. 3, multiple waveguides 100 are formed in parallel with each other on a substrate 300. These waveguides 100 share the beam spot of light from a wide band light source 310, which is positioned above the waveguides.

Meanwhile, the waveguide amplifier of the present invention further comprises means for focusing light from a light source onto the waveguide in the top pumping process. Such focusing means will be described in the following embodiments. The same constitutional elements are indicated with the same reference numbers and thus repetitive detailed descriptions thereof will be omitted.

FIRST EMBODIMENT

Figure 4:
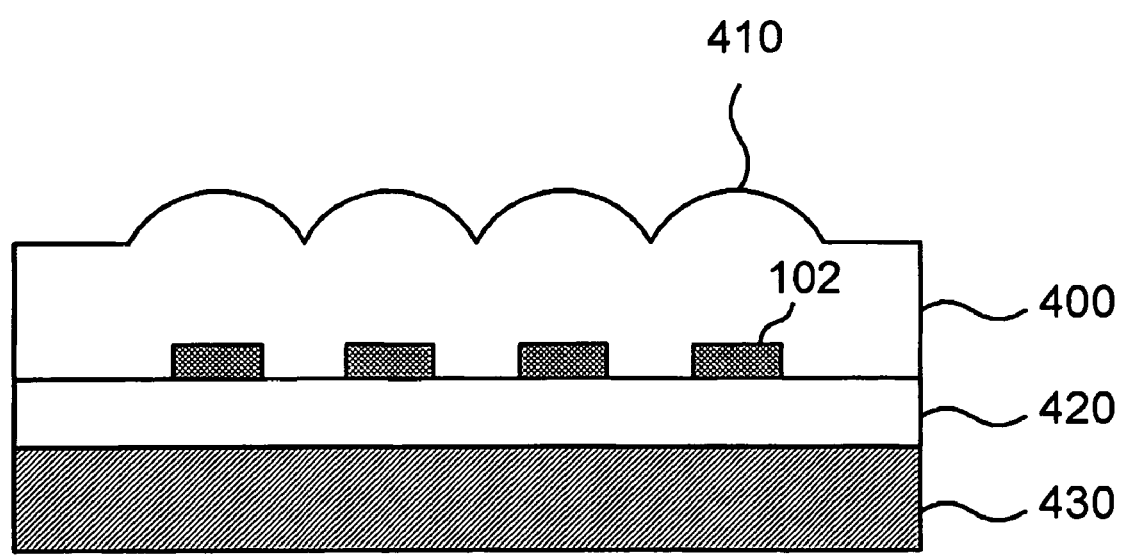
FIG. 4 is a schematic cross sectional view showing a waveguide amplifier using the optical focusing technique according to the first embodiment of the present invention.

It is understood that in order to increase the pumping efficiency, after collecting light from a light source using an optical device such as a lens, a waveguide can be pumped using the light so collected. However, because the size of the waveguide is very small and costly, there is a limitation to the use of such a separate optical device. Therefore, in order to collect light at a low price, prominences 410 are formed on an upper cladding layer 400 of core layers 102 to act as convex lenses, as shown in FIG. 4. The prominences 410 are formed in a linear arrangement, similar to the core layers 102. They may be formed by etching the upper cladding layer 400, or by using a polymer such as PMMA subsequent to vapor deposition of the upper cladding layer 400.

In case of etching the upper cladding layer 400 for the purpose of forming the prominences 400, a "diffusion-limited etching process" can be used. Although such an etching process is little used in manufacturing of semiconductor devices, it is often selectively used to etch structures requiring special shapes. The principle of the etching depends on diffusion of an etching reagent. The etching rate increases at an area where sufficient etching reagent is provided due to rapid diffusion; but the etching rate decreases at an area where insufficient etching reagent is provided due to slow diffusion. In this regard, an etching mask with an opening line pattern can be used. An etching rate is slow at the center portion between the opening lines and is fast at the opening lines. As a result, linear prominences 410 are formed.

In FIG. 4, reference number 430 indicates a substrate and reference number 420 indicates a silica lower cladding layer.

SECOND EMBODIMENT

Figure 5:
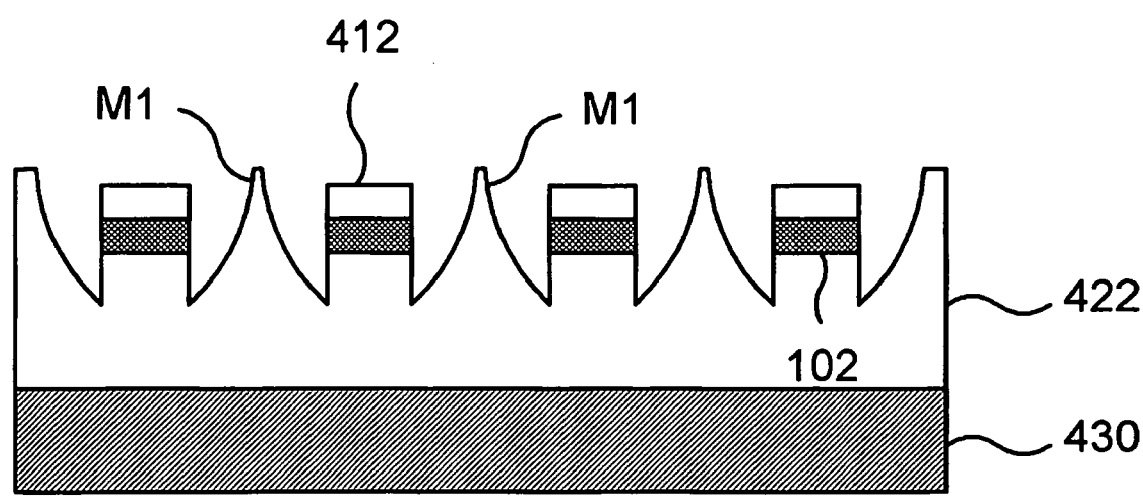
FIG. 5 is a schematic cross sectional view showing a waveguide amplifier using the optical focusing technique according to the second embodiment of the present invention.

FIG. 5 is a schematic cross sectional view showing a waveguide amplifier using the optical focusing technique according to the second embodiment of the present invention. According to the second embodiment of the present invention, a pump light is focused onto a core layer 102 using the reflection of a concave mirror M1 which is formed by deeply etching and then coating a lower cladding layer 422. In this case, the position of the core layer 102 and the curvature of the concave mirror M1 are modulated in order for the core layer 102 to be positioned at the focal point of the concave mirror M1. In FIG. 5, reference number 412 indicates an upper cladding layer.

THIRD EMBODIMENT

Figure 6:
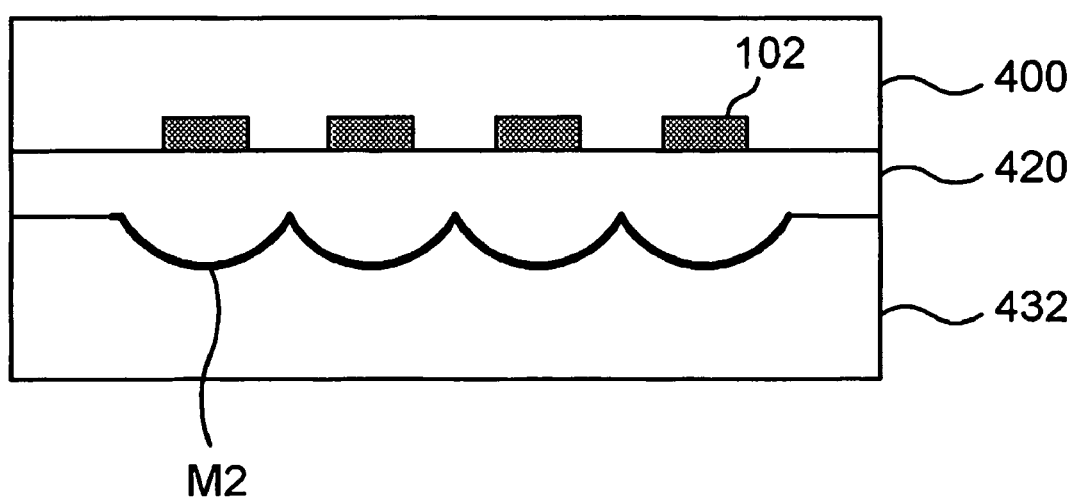
FIG. 6 is a schematic cross sectional view showing a waveguide amplifier using the optical focusing technique according to the third embodiment of the present invention.

In the second embodiment, a deep etching process was used to form a mirror surface. In the case that it is somewhat difficult to carry out such a process, it is preferable to use a mirror without a deeply etched structure. FIG. 6 is a schematic cross sectional view showing a waveguide amplifier using the optical focusing technique according to the third embodiment of the present invention. Reference is made to FIG. 6, first, grooves in the form of line are formed in a transparent substrate 432. Then, the grooves are mirror coated to thereby form mirrors M2. Similar to the second embodiment, the core layer 102 is positioned at the focal point of each mirror M2.

INDUSTRIAL APPLICABILITY

As apparent from the above description, the present invention provides a waveguide amplifier with low cost and high efficiency, resulting from increasing the pump light efficiency per waveguide using a wide band light source. This enables integration of optical devices as well as lowering unit cost of the optical device. As a result, remarkable development is accomplished in the field of optical devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A waveguide amplifier, comprising:
   (a) a substrate;
   (b) an optical waveguide including a lower cladding layer formed on the substrate, a core layer formed on the lower cladding layer, which is made of a silica or silica-based material co-doped with silicon nanoclusters and rare earth atoms and has a higher refractive index than the lower cladding layer, and an upper cladding layer formed on the core layer; and
   (c) a light source for pumping the waveguide, which is positioned above the waveguide, characterized in that the waveguide amplifier is operated in a manner such that the rare earth element is excited through an electron-hole combination formed in the silicon nanocluster.

2. The waveguide amplifier as set forth in claim 1, wherein the light source is a visible light source.

3. The waveguide amplifier as set forth in claim 2, wherein the light source is LED or a flash lamp.

4. The waveguide amplifier as set forth in claim 1, wherein multiple optical waveguides are arranged in the beam spot of the light source.

5. The waveguide amplifier as set forth in claim 1, further comprising means for focusing a pump light from the light source onto the waveguide.

6. The waveguide amplifier as set forth in claim 5, wherein the pump light from the light source is refractively focused onto the waveguide, which is formed with prominences in the form of convex lenses on the upper cladding layer thereof.

7. The waveguide amplifier as set forth in claim 5, wherein the pump light from the light source is reflectively focused onto the waveguide, which is formed with mirror surfaces.

8. The waveguide amplifier as set forth in claim 5, wherein the pump light from the light source is reflectively focused onto the waveguide using mirror surfaces formed on the substrate.

* * * * *